3,455,856
PIGMENTED PRINTING INK AND METHOD
Robert W. Voedisch, Morton Grove, and Reginald
de Pelichy, Skokie, Ill., assignors to Lawter Chemicals, Inc., Chicago, Ill., a corporation of Delaware
No Drawing. Filed Nov. 4, 1965, Ser. No. 506,388
Int. Cl. C09d 11/10; C08g 51/72, 51/02
U.S. Cl. 260—21                                11 Claims This invention relates to a printing ink in which the pigment particles are suspended in an ink vehicle and it relates more particularly to a printing ink composition containing a pigmented resin suspended in finely divided form as a pigment in an oil modified alkyd resin vehicle.

To the present, such printing ink compositions have been formulated of a resinous system based upon a triazine-paraformaldehyde-aryl sulfonamide aldehyde resin to which a dyestuff has been added for grinding into a pigment. Suitable resinous systems formed of urea or melamine formaldehyde-paratoluene sulfonamide aldehyde are described in the Kazenas Patents Nos. 2,809,954 and 2,938,873. Suitable resinous systems formed of benzoguanamine as the triazine reacted with paratoluene sulfonamide formaldehyde are described in the D'Alelio et al. Patent No. Re. 25,845. The solidified resinous systems embodying the desired dyestuff for pigmentation are ground to finely divided form by conventional grinding mills for suspension as a pigment in the ink vehicle.

It has been found that such conventional grinding techniques are incapable of use to achieve reduction in particle size to an average dimension of less than 1.5 microns and it has been found also that the particles that are formed are irregular in shape and dimension with the result that it is difficult to achieve a stable suspension of such pigment particles in an ink vehicle.

Numerous attempts have been made to achieve finer grinding of the pigment particles but it has been found to be impractical to effect reduction of the particles to an average size of less than 1.5 microns. It is believed that a more stable suspension of the pigment particles in the ink vehicle might be achieved if the pigment particles were capable of being reduced to a smaller dimension and if the pigment particles were formed into a uniform size distribution.

In the attempt to secure such pigment particles of smaller dimension and of more uniform size, such pigment particles have been fabricated by the technique of precipitation in situ in a liquid medium as described in the copending application Ser. No. 368,400, filed May 8, 1964 now Patent No. 3,361,677, issued Jan. 2, 1968, and entitled "Fluorescent Precipitation Pigments and Method." However, the precipitation technique has been faced by the problem of loss of brilliance of the ink composition formed of such pigments, perhaps by reason of the strong alkali employed in the procedures.

It is an object of this invention to produce and to provide a method for producing a printing ink composition in which the pigment particles suspended in the ink vehicle are of sufficiently small dimension to provide a stable ink composition; in which the pigment particles are of relatively uniform shape to permit rapid and complete suspension in the ink vehicle to provide a stable ink composition; in which the pigment particles suspended in the ink vehicle are of a particle size less than one micron and preferably less than .25 micron and in which the pigment particles suspended in the ink vehicle are of spherical shape whereby a more uniform and stable suspension in the ink vehicle is capable of being achieved.

The concepts of this invention reside in the particular technique by which the materials are combined and formed to make up the printing ink composition as distinguished from the materials of which the ink composition is formed. In other words, the formulation of materials of which the ink composition of this invention is formed is well known but invention will be found to exist in the method and means for combining the materials whereby pigment particles of small dimension and of spherical shape are formed in suspension in the ink vehicle to produce a new and improved pigmented printing ink composition.

Thus, use is made of a vehicle in the form of an alkyd resin prepared by the reaction of a polyhydric alcohol such as glycerine or pentaerythritol or other polyhydric alcohol with a polybasic acid or anhydride such as phthalic acid, isophthalic acid, phthalic anhydride, maleic anhydride and the like, as represented by the alkyd resin identified by the trade name "Trionol No. 3". The alkyd resin is modified with a drying oil, such as linseed oil, in the ratio of 125 to 250 parts by weight oil per 1,000 parts by weight of resin to form an oil modified alkyd resin which will hereinafter be referred to as the varnish.

The invention will hereinafter be described with reference to a specific example for the manufacture of a printing ink composition. It will be understood that various changes may be made with respect to the materials, their amounts and reaction conditions, as will hereinafter be pointed out.

EXAMPLE 1

| Composition: | Parts by weight |
|---|---|
| Oil modified alkyd resin varnish (Trionol No. 3) | 1,000 |
| Linseed oil | 200 |
| Mixture of ortho- and paratoluene sulfonamide-formaldehyde resin (Santolite MHP) | 785 |
| Benzoguanamine | 244 |
| Melamine | 164 |
| Paraformaldehyde | 300 |
| Fluorescent dyestuff (Rhodamine 7G) | 13 |
| Fluorescent dyestuff (Rhodamine BX) (meta-diethyl amino phenolphthalein hydrochloride) | 17 |
| Water | 360 |

Procedure

The varnish and oil are charged into a container fitted with a high speed mixer and the paratoluene sulfonamide aldehyde resin is added. The mixture is heated to the melting point temperature of the paratoluene sulfonamide resin (about 180° F.) with continuous mixing. Since the molten paratoluene sulfonamide resin is insoluble in the varnish, the resin will become dispersed as very fine droplets in the varnish.

The paraformaldehyde and water are added to the heated mixture followed immediately by the addition of the benzoguanamine and melamine. The mixture is then heated with vigorous stirring to a temperature of about 212° F. and it is held at this temperature for an extended reaction by the water added and the water given off from the reaction until such water has been driven off from the mixture. The heat for raising the temperature of the reaction and for maintaining the temperature can be supplied from an external heat source but it is preferred to build up the temperature of the reaction by the heat given off in shear resulting from the mixing action. However, use can be made of the combination of external heat coupled with the heat of shear.

Thereafter the dyestuffs are added and the reaction is completed by heating to a temperature above 265–300° F., depending somewhat upon the temperature requirements of the printing ink, as will hereinafter be explained.

The materials are subjected to stirring in shear throughout the reaction cycle. This operates to break down the paratoluene sulfonamide-aldehyde resin into such fine particles in the varnish as to enable rapid reaction between the fine suspended particles of the parasulfonamide-aldehyde resin and the melamine, benzoguanamine aldehyde materials which are added at the temperature conditions existing. This operates to cause condensation polymerization to take place between the materials to form a resinous system having a melting point above the temperature of the reaction whereby the resinous material solidifies in situ in suspension in the varnish while remaining in its finely divided, spherical form.

An important concept of this invention resides in the control of the reaction rate and temperature to increase the melting point of the formed resinous reaction product to a temperature above the reaction temperature of the mixture so that the small particles of the formed resinous material will remain in the solid state suspended in the ink vehicle during the continued reaction. Thus it is desirable to hold the temperature of the reaction down during resin formation to maintain the temperature below the melting point temperature of the formed resinous particles. Such temperature control can best be achieved by the addition of water to the reaction mixture thereby to increase the length of time that the reaction is maintained at a temperature in the range of about 212° F. to insure the progress of the reaction for formation of polymers having a melting point above the reaction temperature. Thereafter, the temperature of the reaction can be raised but at levels to maintain the temperature below the increasing melting point temperature of the polymerized resin.

The formed resinous particles retain their dimension and spherical shape acquired during suspension in the ink vehicle with the result that the formed pigment particles suspended in the vehicle will be of small dimension of less than 1 micron and preferably within the range of 0.1 to 0.25 micron and such particles will be in the shape of almost perfect spheres of a uniform particle size.

The dyestuffs can be added with the resin-forming materials but it is preferred to add the dyestuffs after the polymerization reaction has progressed for a period of time to near the completion of the reaction. Thus the dyestuffs which are soluble in the resinous polymer, as distinguished from the varnish, will be taken up entirely by the particles of resin to form a colored pigment dispersed in finely divided form in the vehicle. If a water soluble dyestuff is employed, it is desirable to add the dyestuff during the polymerization reaction while water is present to dissolve the dyestuff and carry it into the polymerization product.

While the description has been addressed to the use of fluorescent dyestuffs in formation of a fluorescent pigment suspended in finely divided form in the printing ink vehicle, it will be understood that combinations of fluorescent dyestuffs and non-fluorescent dyestuffs may be employed to produce colored fluorescent pigment particles. However, the concepts of the invention for production of a suspension of microscopic pigment particles of uniform size distribution in suspension in a printing ink vehicle may be employed in the production of printing inks other than fluorescent printing inks by the substitution of dyestuffs other than fluorescent dyestuffs in the composition processed in accordance with the described concepts of this invention. Thus the invention is not limited to the particular dyestuffs employed or their amounts but resides instead in the procedural steps in which the pigment polymer is formed in situ in the varnish while dispersed as fine globular particles and under conditions whereby the finely divided state and shape is maintained through the polymerization reaction thereby to avoid the agglomeration and formation of the dyed resinous system into particles of larger dimension or irregular shape.

Other dyestuffs which may be employed are described in the aforementioned issued patent of D'Alelio et al.

Instead of the paratoluene sulfonamide-formaldehyde resin, use can be made of the components thereof in corresponding amounts including the paratoluene sulfonamide and formaldehyde which can be added as separate ingredients to the vehicle for reaction during the polymerization step to form the condensation product. Others of the aryl sulfonamides or aryl sulfonamide-aldehyde resins can be employed in equivalent amounts, such as, for example, benzene sulfonamide, and the like.

Instead of paraformaldehyde, use can be made of formaldehyde or formalin or such other aldehydes as glyoxal, pyruvic aldehyde, acid aldehyde, and the like, but with less desirable results from the standpoint of friability and hardness.

Instead of the mixture of benzoguanamine and melamine, use can be made of other triazines such as benzoguanamine alone, melamine alone, or various mixtures of benzoguanamine, melamine and/or urea in various amounts. The amount of triazine that is incorporated for reaction with the aryl sulfonamide-aldehyde should be sufficient to react with the aryl sulfonamide, in the presence of the aldehyde, to form a resinous polymer having a melting point which is sufficiently high to resist melting or plasticity at the temperature to which the printing ink will be exposed during drying and which will be raised to a melting point during reaction to exceed the temperature of the reaction mixture thereby to resist fusion or agglomeration of the suspended particles of small dimension in the ink vehicle.

Thus in the production of a printing ink to be dried at a temperature below 250° F., it will be sufficient if the mol percent of triazine, such as melamine or urea, reacted with the aryl sulfonamide is as low as 25 mol percent. Where the ink composition is to be exposed to temperatures in excess of 300° F., it is desirable to make use of a formulation in which the polymerized resinous material is either thermosetting or else has a melting point above 300° F. and, for this purpose, it is desirable to make use of a formulation in which the mol percent of triazine, such as benzoguanamine, is at least 50 mol percent of the aryl sulfonamide and preferably within the range of 60 to 100 mol percent of the aryl sulfonamide. The mol percent for production of higher melting point resins can be reduced by the use of increasing amounts of melamine or urea but it is preferred to maintain the ratio of triazine to aryl sulfonamide within the range of 25 to 100 mol percent and preferably within the range of 60 to 95 mol percent.

The following are additional examples of formulations for pigment preparation in accordance with the practice of this invention:

EXAMPLE 2

| | Parts by weight |
|---|---|
| Ortho- and paratoluene sulfonamide-formaldehyde resin (Santolite MHP) | 1,000 |
| Benzoguanamine | 400 |
| Melamine | 150 |
| Paraformaldehyde | 300 |
| Fluorescent dyestuff (Rhodamine 7G) | 16 |
| Fluorescent dyestuff (Rhodamine BX) | 21 |
| Water | 40 |

EXAMPLE 3

| | Parts by weight |
|---|---|
| Paratoluene sulfonamide-formaldehyde resin | 1,000 |
| Benzoguanamine | 480 |
| Melamine | 70 |
| Paraformaldehyde | 270 |
| Dyestuff (Brilliant Azosol Yellow) | 67 |
| Dyestuff (Rhodamine 7G) | 15 |
| Dyestuff (Rhodamine BX) | 13 |
| Phthalic anhydride catalyst | 2 |
| Water | 45 |

EXAMPLE 4

| | Parts by weight |
|---|---|
| Oil modified alkyd resinous varnish | 1,000 |
| Toluene sulfonamide-formaldehyde resin | 730 |
| Benzoguanamine | 445 |
| Paraformaldehyde | 160 |
| Water | 80 |
| Dyestuff (Rhodamine BX) | 8 |
| Dyestuff (Rhodamine 7G) | 8 |
| Brilliant Yellow 6G base | 18 |

EXAMPLE 5

| | Parts by weight |
|---|---|
| Oil modified alkyd resinous varnish | 1,000 |
| Ortho- and paratoluene sulfonamide-formaldehyde resin | 720 |
| Melamine | 125 |
| Paraformaldehyde | 98 |
| Fluorescent dyestuff (Rhodamine 7G) | 14 |
| Fluoroescent dyestuff (Rhodamine BX) | 18 |
| Water | 70 |

EXAMPLE 6

| | Parts by weight |
|---|---|
| Oil modified alkyd resin varnish (Trionol No. 3) | 1,000 |
| Linseed oil | 200 |
| Paratoluene sulfonamide - formaldehyde resin (Santolite MHP) | 785 |
| Benzoguanamine | 244 |
| Melamine | 164 |
| Paraformaldehyde | 300 |
| Fluorescent dyestuff (Rhodamine 7G) | 13 |
| Fluorescent dyestuff (Rhodamine BX) | 17 |

The procedure that is followed in each of the Examples 2–6 is the same as that for Example 1 with the exception that, in Example 6, where no water has been added, external cooling is employed to keep the temperature of the reaction below 210° F. for a period of time ranging from 30 to 90 minutes after the addition of the benzoguanamine and melamine to permit the condensation polymerization reaction to proceed to form a resinous material before raising the temperature of the mixture for completion of the polymerization reaction. By this time, the polymer is formed of the paratoluene sulfonamide-triazine aldehyde to form a resin having a melting point above the temperature of the reaction mixture and which therefore can be increased in molecular weight to maintain the melting point of the resin above the increasing temperature of the mixture.

It is desirable slowly to increase the temperature of the mixture to permit maximum polymerization of the resin for solidification of the dispersed resin-forming particles and for maintaining the dispersed particles in their solid state. Under these conditions, pigmented resinous particles are formed in the ink varnish which appear to be spherical in shape and of a particle size less than 1 micron and which more often measure to less than 0.25 micron.

The formed pigment particles are easily retained in suspension in the ink vehicle to produce a stable ink composition which does not require mixing or agitation in use and from which copy of good and uniform quality can be constantly secured. Such uniform distribution of such fine particles of uniform size and shape has heretofore been incapable of procurement by other know processes of pigmentation, such as by means of fine grinding or precipitation, such that it is believed that the pigment particles per se and the ink composition formed thereof constitute new and improved articles of manufacture.

It will be understood that changes may be made in the formation and reaction conditions without departing from the spirit of the invention, especially as defined in the following claims.

We claim:
1. In the method of producing an ink vehicle formulated of a liquid varnish having pigment particles in finely divided form suspended therein wherein the pigment particles are formulated of an aryl sulfonamide aldehyde-triazine aldehyde resin containing tinctorial agents, the steps of dispersing the aryl sulfonamide in a liquid varnish in which the aryl sulfonamide is insoluble and while the materials are heated to a temperature above the melting point temperature of the aryl sulfonamide whereby the aryl sulfonamide becomes suspended in the varnish in finely divided form, said varnish being selected from the group consisting of an alkyd resin and an oil modified alkyd resin, adding the remainder of the resin forming ingredients and tinctorial agents for polymerization reaction with the aryl sulfonamide while suspended in the varnish in finely divided form to produce a colored solidified resinous polymer of finely divided particles having a melting point above the temperature of the suspension, heating the suspension to higher temperatures for advancing the polymerization of the resin but at a rate whereby the temperature of the suspension is always below the increasing melting point temperature of the polymerizing resin of the solid pigment particles, and maintaining a high state of agitation in the suspension during the polymerization reaction to retain the pigment forming material in suspension in finely divided form in the liquid varnish.

2. The method as claimed in claim 1 in which the aryl sulfonamide is selected from the group consisting of paratoluene sulfonamide, orthotoluene sulfonamide, mixtures of para- and orthotoluene sulfonamide, and benzene sulfonamide and formaldehyde condensates thereof.

3. The method as claimed in claim 1 in which the triazine is selected from the group consisting of urea, melamine and benzoguanamine.

4. The method as claimed in claim 1 in which the triazine is present in the amount of 25 to 100 mol percent of the aryl sulfonamide.

5. The method as claimed in claim 1 in which the triazine is present in the amount of 60 to 100 mol percent of the aryl sulfonamide.

6. The method as claimed in claim 1 in which the triazine is present in the amount of 60 to 95 mol percent of the aryl sulfonamide.

7. The method as claimed in claim 1 in which the tinctorial agents are daylight fluorescent dyestuffs to produce a daylight fluorescent ink pigment.

8. The method as claimed in claim 1 in which water is added with the resin forming materials to the suspension to maintain the temperature of the suspension below 212° F. over a longer period of time for the initial polymerization reactions.

9. The method as claimed in claim 1 in which the suspension is heated to a temperature of at least 300° F.

10. The method as claimed in claim 1 in which the formed pigment particles have an average dimension of less than 1 micron.

11. The method as claimed in claim 10 in which the pigment particles are of rounded shape.

(References on following page)

References Cited

UNITED STATES PATENTS

| | | | |
|---|---|---|---|
| Re. 25,845 | 8/1965 | D'Alelio et al. | 252—301.2 |
| 2,391,959 | 1/1946 | Gallowhur | 252—301.2 |
| 2,499,004 | 2/1950 | Seil et al. | 260—33.6 |
| 2,809,954 | 10/1957 | Kazenas | 252—301.2 |
| 2,938,873 | 5/1960 | Kazenas | 252—301.2 |
| 2,940,937 | 6/1960 | O'Brien | 252—301.2 |
| 3,361,677 | 1/1968 | Voedisch | 252—301.2 |

FOREIGN PATENTS 232,157   1/1961   Australia.

DONALD E. CZAJA, Primary Examiner

R. W. GRIFFIN, Assistant Examiner

U.S. Cl. X.R.

106—23, 27; 252—301.2; 260—22, 40, 850